(12) United States Patent
Halwany et al.

(10) Patent No.: US 12,468,665 B1
(45) Date of Patent: Nov. 11, 2025

(54) CASCADED REPLICATION

(71) Applicant: VAST DATA LTD., Tel Aviv (IL)

(72) Inventors: Nadav Halwany, Tel Aviv (IL); Benny Lodman, Tel Aviv (IL); Ohad Ben-Yehuda, Tel Aviv (IL); Oren Ashkenazi, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 70 days.

(21) Appl. No.: 18/458,116

(22) Filed: Aug. 29, 2023

(51) Int. Cl.
*G06F 16/182* (2019.01)
*G06F 16/11* (2019.01)

(52) U.S. Cl.
CPC ........ *G06F 16/1844* (2019.01); *G06F 16/128* (2019.01); *G06F 16/1824* (2019.01)

(58) Field of Classification Search
None
See application file for complete search history.

(56) References Cited

U.S. PATENT DOCUMENTS

| | | | |
|---|---|---|---|
| 7,653,668 B1* | 1/2010 | Shelat | G06F 16/184 707/610 |
| 8,799,211 B1* | 8/2014 | Bezbaruah | G06F 16/184 707/610 |
| 2015/0052103 A1* | 2/2015 | Huang | G06F 11/1464 707/610 |
| 2021/0133038 A1* | 5/2021 | Ling | G06F 16/178 |

* cited by examiner

*Primary Examiner* — Grace Park
(74) *Attorney, Agent, or Firm* — Reches Patents

(57) ABSTRACT

A method for asynchronous replication, the method includes initiating a current replication cycle of multiple files system entities (FSEs) that include primary FESs originated from a primary storage system (PSS) and external FSEs that originated from one or more external storage systems (ESSs), each external storage system differs from the primary storage system and differs from a secondary storage system. The initiating is followed by sending primary content and external content from the primary storage system to the secondary storage system. The primary content is indicative of differences in the primary FSEs between a previous replication cycle point in time (PIT) and a current replication cycle PIT. For each external FSE, an external content is indicative of differences in the external FSEs between (a) a last external FSE snapshot that preceded the previous replication cycle PIT and was generate by an external FSE snapshot process, and (b) a last external FSE snapshot that preceded the current replication cycle PIT and was generate by the external FSE snapshot process. The external FSE snapshot process and a process for generating the current replication cycle are not mutually synchronized.

18 Claims, 4 Drawing Sheets

CASCADED REPLICATION

BACKGROUND

In asynchronous replication, a bulk of changed data is sent periodically from a source storage system to a destination storage system. Asynchronous replication utilizes snapshots for synchronizing a point in time between the source storage system and the destination storage system. Upon each replication cycle, a snapshot is taken at the source storage system to capture an image of the storage to be synchronized during the cycle, the changed data (comparing to a previous snapshot) is sent to the destination storage system. When the replication cycle is completed, the destination storage system takes a snapshot, which matches the snapshot that was taken at the source storage system.

Upon resuming the replication following a disconnection in the replication communication, the most recent snapshot taken is used as a synchronized point in time, that serves as a starting point for resuming the updates. The destination storage system usually reverts to the content of the last synchronized snapshot, before accepting updates from the source storage system.

When using a cascaded replication, a first storage system replicates changes that occurred on the first system to a second storage system, and the second storage system replicates to a third storage system, both the changes that originated on the first storage system and changes that originated on the second storage system.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
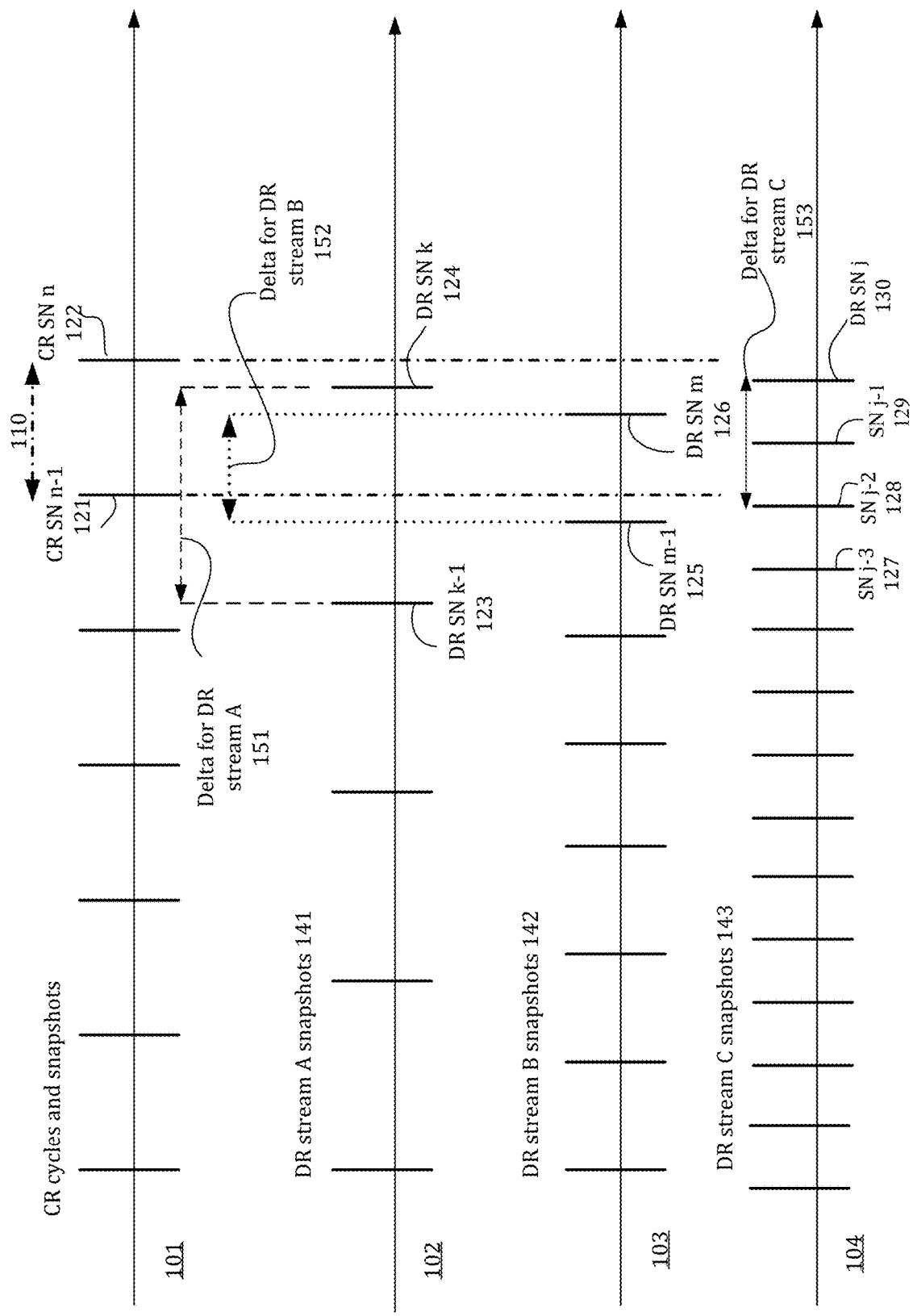
FIG. 1 is an example of timing diagrams.

Any reference to "may be" should also refer to "may not be".

In the following detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A Filesystem in a storage system includes multiple filesystem entities (FSEs), such as directories, files or other objects. Each FSE may be part of a replication stream between the storage system and another storage system. Each FSE that is part of a replication stream may be the source or the destination of the replication stream. Each FSE that plays the destination role in a replication (replica of a source FSE that is stored at another storage system) may be part of a certain replication stream out of multiple replication streams that involve FSEs of the filesystem. Different FSEs may be replicated by different replication streams that may involve different peer storage systems. A replication stream is part (e.g., a sub-tree) of the filesystem that includes multiple FSEs (e.g., directories and files) being replicated between a source and a destination storage system.

A replication process is performed in replication cycles, where cycles of different replication streams may be performed at different frequencies, for example, remote peer systems may employ less frequent cycles of replication than closer peer systems, or the frequency may depend on the content being replicated.

Each replication cycle is associated with a snapshot that seals the replication cycle. Therefore, each replication stream is associated with one or more replication snapshots that sealed the previous replication cycles and can be used as synchronization points between the source and destination systems.

According to embodiments of the present invention, a primary storage system and a secondary storage system are engaged in a cascaded replication (CR) process, where the primary storage system sends to the secondary storage system, changed content of multiple FSEs (hereinafter CR FSEs) that participate in the CR, and form part or all of the filesystem that resides on the primary storage system, wherein different CR FSEs of the multiple FSEs are also engaged in additional replication processes against other storage systems, wherein each of the CR FSEs, that is sent from the primary storage system to the secondary storage system as part of the CR, may be either: (i) a destination FSE of another replication process (other than the CR), whose content is originally sent from another storage system (other than the primary or the secondary storage system), or (ii) a source FSE that was created and/or having content that was originally written on the primary storage system. Different destination FSEs may originate from different other storage systems.

The cascaded replication (CR) process is composed of multiple CR cycles, wherein each CR cycle, at a primary storage system, may start with taking a CR snapshot of the CR FSEs to be replicated as part of the CR, that captures an image of the content of the CR FSEs at the time of starting the replication cycle. The replication cycle is then performed for changes that occurred between the previous CR snapshot of the last CR cycle (referred to as first CR cycle point) and the current CR snapshot that is taken before starting the current CR cycle (referred to as second CR cycle point).

However, not all the changes that occurred since the previous CR cycle (i.e., between the first and the second CR cycle points) are replicated, so as to avoid conflicts with synchronized replication snapshots taken for CR FSEs that act as destination FSEs of various replication streams against various other storage systems. The content sent during the CR cycle should be synchronized with the different (non-CR) replication snapshots (referred to herein as destination snapshots) taken for the various destination FSEs, and there is a need to avoid sending content of any destination FSE, that was not sealed by a destination snapshot when the current CR cycle starts.

It is noted that the primary storage system may store contents of destination FSEs that were received after taking the last corresponding destination snapshots. Content that was written after the last destination snapshot is discarded when there is a need to revert to the last sealed destination snapshot, when performing failure recovery against a storage system that serves as the source of replicating the destination FSE that needs to be reverted to the last destination snapshot. Given the mixture of various destination snapshots associated with the CR replication at the primary storage system, and given that the secondary storage is not aware of these various destination snapshots, there is a need to avoid sending content that was written after taking the corresponding destination snapshot.

Therefore, during the current CR cycle, the primary storage system sends the changes that occurred since the previous CR snapshot—only for source FSEs (i.e., FSE changes that originated on the primary storage system). For any destination FSE, replication is avoided for updates that occurred after the last (most recent) destination snapshot of a replication stream associated with that destination FSE, wherein the last destination snapshot was sealed on or before the starting of the current CR cycle, e.g., before destination snapshot SN(k) 124 of FIG. 1.

Since the previous CR cycle avoided replicating updates that occurred after the destination snapshot that was the last sealed destination snapshot when the previous CR cycle started, there is a need to replicate, during the current CR cycle, any update that occurred for a destination FSE after the last sealed destination snapshot existed at the previous CR cycle, e.g., any update occurred after destination snapshot SN(k−1) 123 for a destination FSE associated with replication stream A—should be replicated. These updates may have been performed before the start of the previous CR cycle, e.g., updates that occurred between SN(k−1) 123 and SN(n—1) 121.

Therefore, unlike source FSEs, for which the replicated updates are those occurred since the previous CR snapshot, the replication of updates of destination FSEs are performed for updates occurred between the last destination snapshot existed when the previous CR cycle (n−1 cycle) started and the last snapshot of the current CR cycle (the nth cycle).

FIG. 1 illustrates a timeline of the CR cycles and the CR snapshots, and three timelines of destination snapshots related to periodic cycles of three replication streams. Timeline 101 illustrates periodic cycles for the CR. The nth CR cycle starts by taking a CR snapshot(n) 122 that marks a second CR point of the nth CR cycle range 110, where a first CR point used during the nth CR cycle is marked by CR snapshot (n−1) 121 that was taken at the start of the previous (n−1) CR cycle.

FIG. 1 further illustrates a timeline 102 of destination replication (DR) cycles of a first DR stream A that is associated with some of the FSEs that act as the destination of the first DR stream A. Timeline 102 illustrates the schedule of DR stream A's destination snapshots 141. Timeline 103 illustrates DR cycles of a second DR stream B that is associated with some other FSEs that act as the destination of the second DR stream B, according to the schedule of DR stream B's destination snapshots 142. The frequency of the cycles of the first DR stream A may be different from the frequency of the cycles of the second DR stream B. For example, the frequency of the DR cycles of the second DR stream B is lower than the frequency of the DR cycles of the first DR stream A. The vertical lines illustrate the timing of the destination snapshots taken at the end of each DR cycle, e.g., DR stream A's destination snapshots 141 and DR stream B's snapshots 142. Timeline 104 illustrates DR cycles of a third DR stream C that is associated with further other FSEs that act as the destination of the third DR stream C, according to the schedule of DR stream C's snapshots 143. The frequency of the DR cycles of the third DR stream C is higher than the other illustrated DR cycles. There may be more than one DR snapshot associated with DR stream C during one CR cycle. For example, DR snapshots SN(j−1) 129 and SN(j) 130, were taken during a CR range of the current CR cycle, i.e., between the start of the previous CR cycle and the start of the current CR cycle. Among these two destination snapshots, SN(j) 130 is considered as the last destination snapshot that was sealed on or before the start of the current CR cycle. destination snapshots SN(j−2) 128 and SN(j−3) 127, occurred during a CR range of the previous CR cycle. Among these two destination snapshots, SN(j−2) 128 is considered as the last destination snapshot that was sealed on or before the start of the previous CR cycle.

All the changes that were made, between the first CR point and the second CR point (or—since the previous CR snapshot n−1 121 and up to CR snapshot n 122), to FSEs that are source FSEs—are replicated to the secondary storage system.

Replicating changes to FSEs that are destinations of DR streams are made only to changes that were made up to the synchronized point of the corresponding DR stream, i.e., up to the last DR snapshot that precedes the current CR snapshot, e.g., up to DR snapshot(k) 124 of the DR stream A—for FSEs that are the destination FSEs of replication stream A, up to DR snapshot(m) 126 of the DR stream B—for FSEs that are the destination FSEs of DR stream B, and up to DR snapshot(j) 130 of the DR stream C—for FSEs that are the destination FSEs of DR stream C.

The previous CR cycle also did not replicate changes that occurred after the last DR snapshot existed when the previous CR cycle started, therefore the current CR cycle performs replication of these changes, that occurred before the CR cycle start time. For example, changes that occurred after DR snapshot(k−1) 123 was taken for DR stream A, changes that occurred after DR snapshot(m−1) 125 was taken for DR stream B, and changes that occurred after DR snapshot(j−3) 127 was taken for DR stream C. FIG. 1 illustrates a delta 151 for DR stream A, which covers all the changes needed to be replicated for destination FSEs of DR stream A, a delta 152 for DR stream B, which covers all the changes needed to be replicated for destination FSEs of DR stream B, and a delta 153 for DR stream C, which covers all the changes needed to be replicated for destination FSEs of DR stream C.

Therefore, the cascaded replication of a destination FSE of a certain DR stream includes changes that occurred between: (i) the last DR snapshot that existed when the previous CR cycle started, and (ii) the last DR snapshot that existed when the current CR cycle started.

Figure 2:
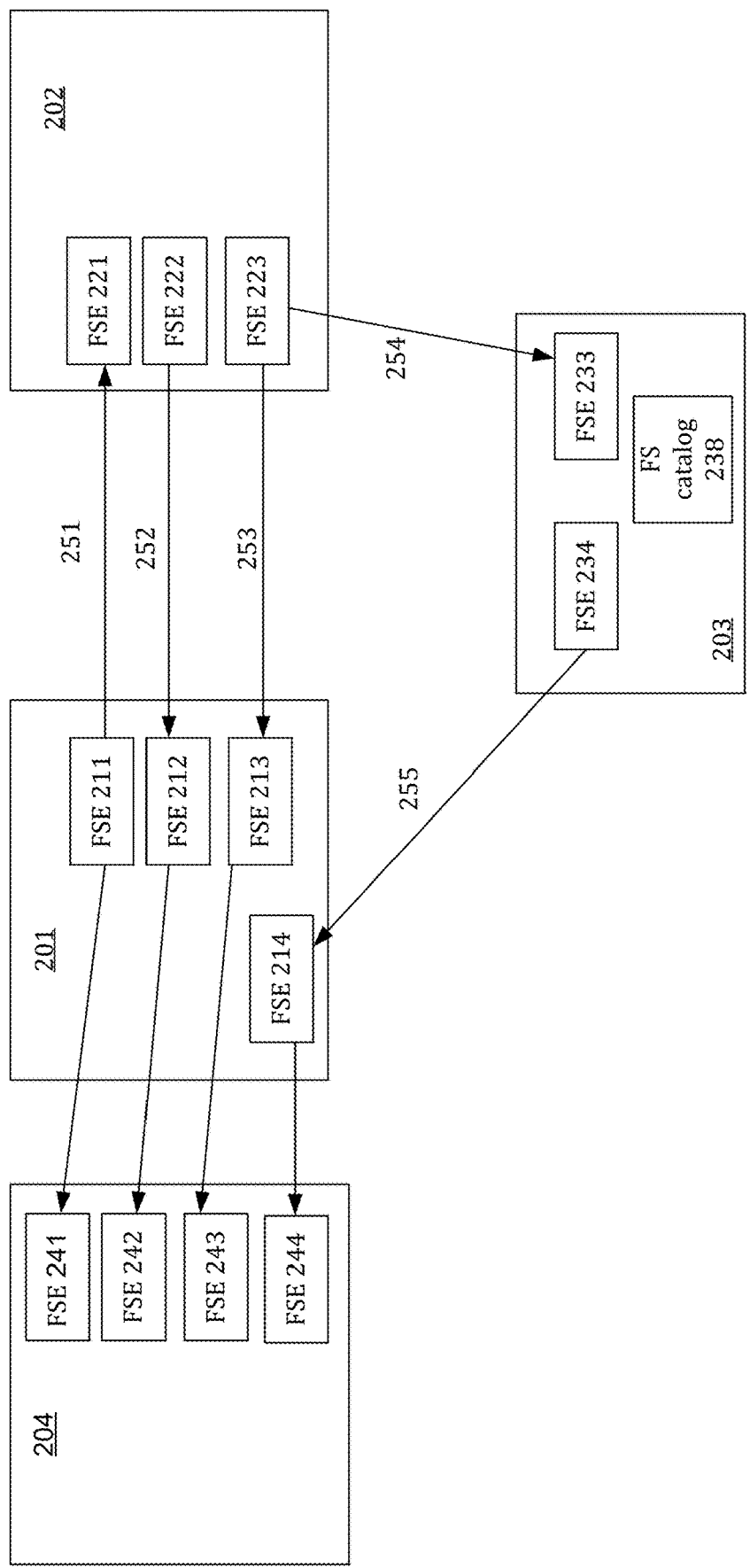
FIG. 2 is an example of storage systems.

FIG. 2 illustrates four storage systems that are engaged in multiple replication streams 251-255. Storage system 201 stores an FSE 211 that is the source FSE of a replication stream 251 towards storage system 202 that stores the replica FSE 221. The content of source FSE 211 originated from storage system 201. Storage system 201 further stores destination FSEs 212 and 213 that are the destinations (replicas) in replication streams 252 and 253, respectively, where the source FSEs are 222 and 223 stored in storage system 202. FSE 223 is the source of two different replication streams, stream 253 towards storage system 201 and stream 254 towards storage system 203. Storage system 201 further stores destination FSE 214 that is the destination (replica) in a replication stream 255, where the source FSE 234 is stored in storage system 203. Each of the replicated FSEs is a directory that may be a root of a sub-tree that includes descended directories and files. Therefore, each of the FSEs of FIG. 2 may represent multiple replicated FSEs. Different replication streams are associated with different snapshots, different snapshot schedules that may have different frequencies.

Storage system 201 is further a primary storage system in a cascaded replication against secondary storage system 204. Upon each CR cycle between storage systems 201 and 204, the changes of destination FSEs 212, 213 and 214 are replicated, as well as source FSE 211, wherein the time range of changes needed to be replicated with regard to destination FSEs is different from the time range of changes needed to be replicated with regard to source FSE—as described for FIG. 1.

Figure 3:
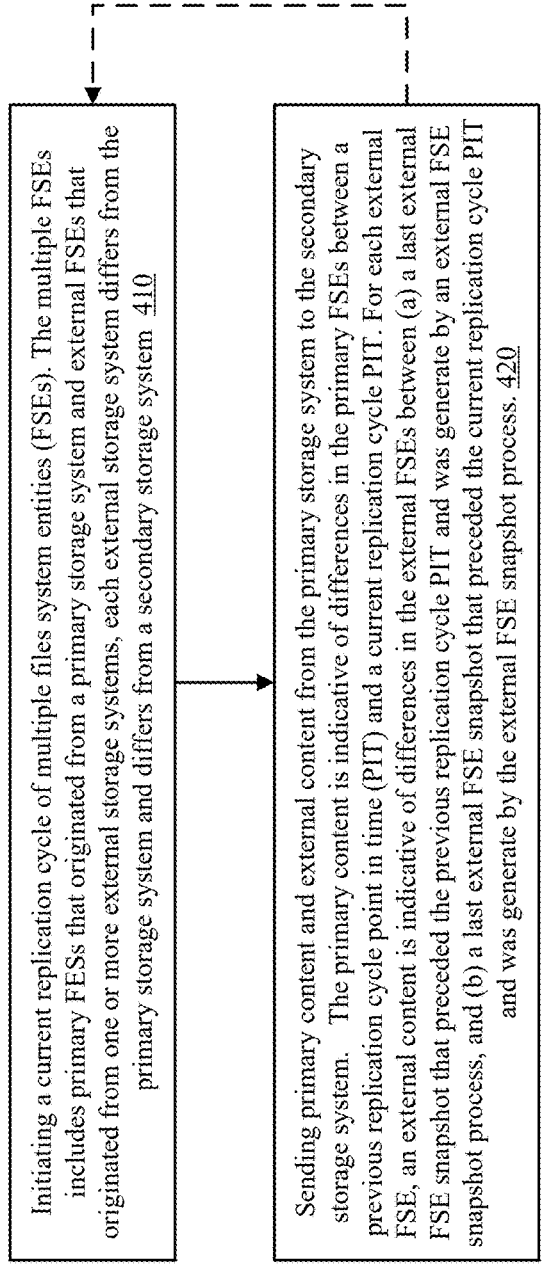
FIG. 3 illustrates an example of a method.

FIG. 3 illustrates an example of method 400 for performing asynchronous replication, that may be a cascaded replication.

According to an embodiment, method 400 starts by step 410 of initiating a current replication cycle of multiple files system entities (FSEs). The multiple FSEs includes primary FSEs (also referred to as source FSEs) that originated from a primary storage system and external FSEs (also referred to as destination FSEs) that originated from one or more external storage systems, each external storage system differs from the primary storage system and differs from a secondary storage system. The initiating may include performing initial steps of the current replication cycle, such as determining points in time that are relevant to the performing of the current replication cycle, and/or selecting differences made in content of FSEs to be sent, according to the determined points in time.

According to an embodiment, the primary storage system may receive one or more external FSEs that originated from an external storage system, and that the primary storage system may perform snapshots of the external FSEs—under timing constraints dictated by the external storage systems.

For example—referring to FIG. 2—assuming that the primary storage system is storage system 201, the secondary storage system is storage system 204. Under this assumption—the primary content is related to FSE 211, the external content is related to FSE 212 and FSE 213 originated from external storage system 202 and is also related to FSE 214 originated from external storage system 203.

According to an embodiment, step 410 is followed by step 420 of sending primary content and external content from the primary storage system to the secondary storage system.

The primary content is indicative of differences in the primary FSEs between a previous replication cycle point in time (PIT) and a current replication cycle PIT. The previous replication cycle PIT may be represented by a previous snapshot of the previous cycle, e.g., SN(n−1) 123, and the current replication cycle PIT may be represented by a current snapshot taken at the current cycle, e.g., SN(n) 124. Other techniques besides taking snapshots may be used for marking these PITs.

For each external FSE, an external content is indicative of differences in the external FSEs between (a) a last external FSE snapshot that preceded the previous replication cycle PIT and was generated by an external FSE snapshot process, and (b) a last external FSE snapshot that preceded the current replication cycle PIT and was generated by the external FSE snapshot process. The term "external" in "external FSE snapshot process" means that the initiation of the process, the responsibility for taking these snapshots, and the responsibility for the snapshot schedule is by an external storage system from which the FSE was originated. In the external FSE snapshot process, the snapshot is taken by the primary storage system, in response to a request from the external storage system. Different external FSEs may be associated with different external storage systems, and therefore associated with different external FSE snapshot processes.

Each external FSE snapshot process and a process for generating the current replication cycle are not mutually synchronized. According to an embodiment, the lack of mutual synchronization results from the fact that the primary storage system determines the timings of the replication cycles, while for each FSE that is originated from an external storage system—the timings of the external FSE snapshots is determined by the external storage systems.

The primary storage systems executes the external FSE snapshots—but under timing constraints imposed by the one or more external storage systems. For example—the method may include receiving by the primary storage and from the one or more external storage systems, instructions related to timings of executions of any of the last external FSE snapshots.

FSEs (particularly external FSEs) originated from different storage systems (particularly external storage systems) may belong to different replication streams. A replication stream is part (e.g., a sub-tree) of the filesystem that includes multiple FSEs (e.g., directories and files) being replicated between a source and a destination storage system.

Steps 410 and 420 may be repeated multiple times, wherein the current replication cycle of one repetition is the previous replication cycle of the next replication cycle. For example—the next replication cycle may include initiating a next replication cycle of the multiple FSEs and sending primary content related to the next replication cycle and external content related to the next replication cycle from the primary storage system to the secondary storage system.

In the foregoing specification, the invention has been described with reference to specific examples of embodiments of the invention. It will, however, be evident that various modifications and changes may be made therein without departing from the broader spirit and scope of the invention as set forth in the appended claims.

Figure 4:
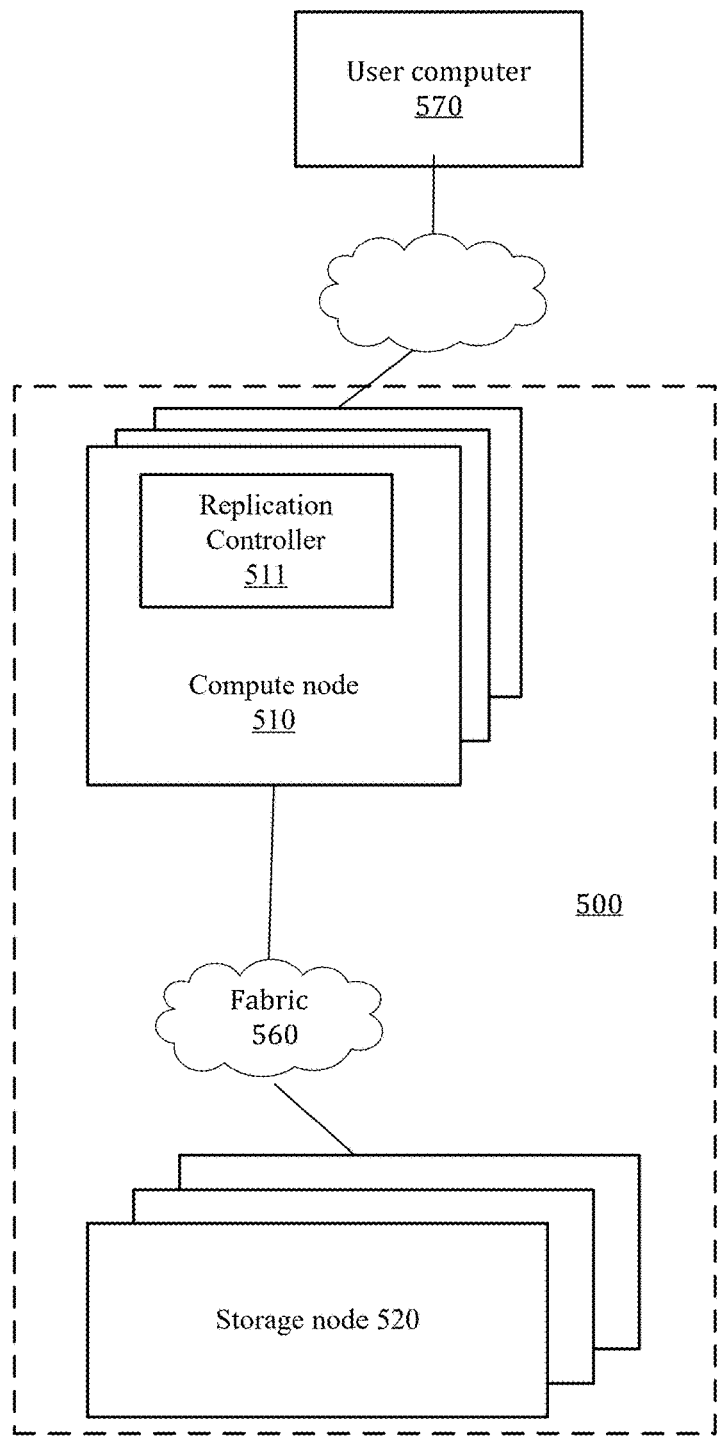
FIG. 4 illustrates an example of a storage system.

FIG. 4 illustrates an example of a storage system 500, which may be any of the storage system of FIG. 2, and particularly the primary storage system. The storage system 500 includes one or more compute nodes 510. Each compute node 510 includes one or more replication controllers, where each replication controller is a hardware controller that can include a processing circuitry, integrated circuitry, a part of processing circuitry, and the like. The processing integrated circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 500 also includes one or more storage nodes 520, wherein each storage node includes storage devices for storing data, The storage devices may be Solid State Drives (SSDs), NVRAM (non-volatile random-access memory) devices, etc. The storage devices may store the FSEs, the snapshots, or any metadata required for performing the replication.

The computer nodes 510 and the storage nodes 520 are connected through a communication fabric 560 for accessing stored data.

The compute nodes are connected to one or more user computers 570 that may access the FSEs, and may define all types of replications and the involved FSEs.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for asynchronous replication, the method comprises:
   initiating a current replication cycle of multiple files system entities (FSEs) that are stored at a primary storage system; wherein the multiple FSEs comprise: (i) primary FSEs that originated from the primary storage system and not received from any external storage system, and (ii) external FSEs that originated from one or more external storage systems, each external storage system differs from the primary storage system and differs from a secondary storage system; and
   sending, during the current replication cycle, primary content and external content from the primary storage system to the secondary storage system; wherein the primary content is indicative of differences in the primary FSEs between a previous replication cycle point in time (PIT) and a current replication cycle PIT;

wherein for each external FSE, an external content is indicative of differences in the external FSE between (a) a last external FSE snapshot that preceded the previous replication cycle PIT and was generated by an external FSE snapshot process, and (b) a last external FSE snapshot that preceded the current replication cycle PIT and was generated by the external FSE snapshot process, wherein the external FSE snapshot process was performed by an external storage system from which the external FSE was originated; and wherein the external FSE snapshot process and a process for generating the current replication cycle are not mutually synchronized.

2. The method according to claim 1, further comprising:

determining, by the primary storage system, the previous replication cycle PIT and the current replication cycle PIT; and executing, by the primary storage system and for each external FSE, any of the last external FSE snapshots.

3. The method according to claim 2, comprising, receiving by the primary storage and from the one or more external storage systems, instructions related to timings of executions of any of the last external FSE snapshots.

4. The method according to claim 1 wherein the one or more external storage systems are a plurality of external storage systems.

5. The method according to claim 4, wherein different external storage systems are associated with different replication streams.

6. The method according to claim 1 comprising:

initiating a next replication cycle of the multiple FSEs; and sending primary content related to the next replication cycle and external content related to the next replication cycle from the primary storage system to the secondary storage system.

7. A non-transitory computer readable medium for asynchronous replication, the non-transitory computer readable medium stores instructions for:

initiating a current replication cycle of multiple files system entities (FSEs) that are stored at a primary storage system; wherein the multiple FSEs comprise: (i) primary FESs that originated from the primary storage system and not received from any external storage system, and (ii) external FSEs that originated from one or more external storage systems, each external storage system differs from the primary storage system and differs from a secondary storage system; and sending, during the current replication cycle, primary content and external content from the primary storage system to the secondary storage system; wherein the primary content is indicative of differences in the primary FSEs between a previous replication cycle point in time (PIT) and a current replication cycle PIT;

wherein for each external FSE, an external content is indicative of differences in the external FSEs between (a) a last external FSE snapshot that preceded the previous replication cycle PIT and was generate by an external FSE snapshot process, and (b) a last external FSE snapshot that preceded the current replication cycle PIT and was generate by the external FSE snapshot process, wherein the external FSE snapshot process was performed by an external storage system from which the external FSE was originated; and wherein the external FSE snapshot process and a process for generating the current replication cycle are not mutually synchronized.

8. The non-transitory computer readable medium according to claim 7, further storing instructions for:

determining the previous replication cycle PIT and the current replication cycle PIT; and executing, for each external FSE, any of the last external FSE snapshots.

9. The non-transitory computer readable medium according to claim 8, further storing instructions for receiving by the primary storage and from the one or more external storage system, instructions related to timings of executions of any of the last external FSE snapshots.

10. The non-transitory computer readable medium according to claim 7, wherein the one or more external storage systems are a plurality of external storage systems.

11. The non-transitory computer readable medium according to claim 10, wherein different external storage systems are associated with different replication streams.

12. The non-transitory computer readable medium according to claim 7, further storing instructions for:

initiating a next replication cycle of the multiple FSEs; and sending primary content related to the next replication cycle and external content related to the next replication cycle from the primary storage system to the secondary storage system.

13. A replication controller of a primary storage system, the replication controller comprises at least a part of an integrated circuit, wherein the replication controller is configured to execute instructions that cause the primary storage system to:

initiate a current replication cycle of multiple files system entities (FSEs) that are stored at the primary storage system; wherein the multiple FSEs comprise: (i) primary FESs that originated from the primary storage system and not received from any external storage system, and (ii) external FSEs that originated from one or more external storage systems, each external storage system differs from the primary storage system and differs from a secondary storage system; and send, during the current replication cycle, primary content and external content from the primary storage system to the secondary storage system; wherein the primary content is indicative of differences in the primary FSEs between a previous replication cycle point in time (PIT) and a current replication cycle PIT;

wherein for each external FSE, an external content is indicative of differences in the external FSEs between (a) a last external FSE snapshot that preceded the previous replication cycle PIT and was generate by an external FSE snapshot process, and (b) a last external FSE snapshot that preceded the current replication cycle PIT and was generate by the external FSE snapshot process, wherein the external FSE snapshot process was performed by an external storage system from which the external FSE was originated; and wherein the external FSE snapshot process and a process for generating the current replication cycle are not mutually synchronized.

14. The replication controller according to claim 13, wherein the replication controller is further configured to execute instructions that cause the primary storage system to:

determine the previous replication cycle PIT and the current replication cycle PIT; and execute, for each external FSE, any of the last external FSE snapshots.

15. The replication controller according to claim 14, wherein the replication controller is further configured to execute instructions that cause the primary storage system to receiving by the primary storage and from the one or more external storage system, instructions related to timings of executions of any of the last external FSE snapshots.

16. The replication controller according to claim 13, wherein the one or more external storage systems are a plurality of external storage systems.

17. The replication controller according to claim 16, wherein different external storage systems are associated with different replication streams.

18. The replication controller according to claim 13, wherein the replication controller is further configured to execute instructions that cause the primary storage system to:
   initiate a next replication cycle of the multiple FSEs; and
   send primary content related to the next replication cycle and external content related to the next replication cycle from the primary storage system to the secondary storage system.

\* \* \* \* \*